J. OLIVER.
PLOW.
No. 7,097.
Reissued May 2, 1876.
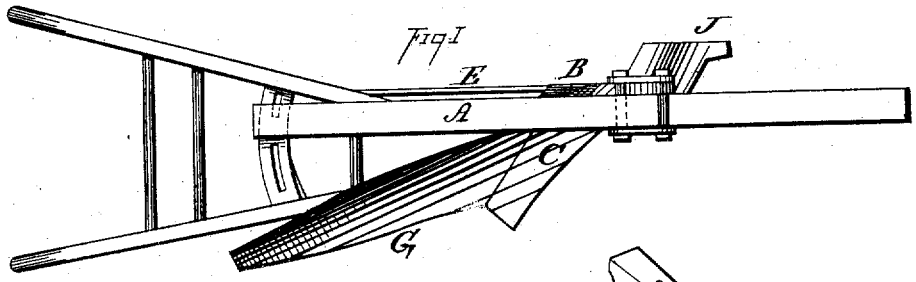
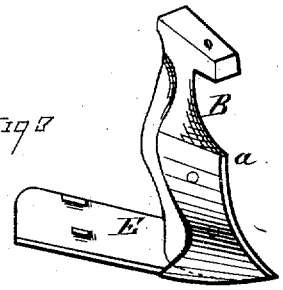
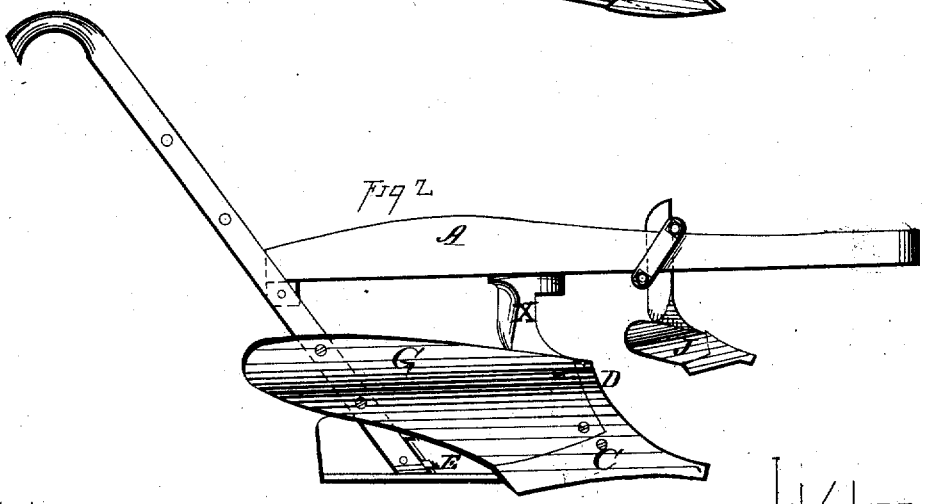
WITNESSES
W. B. Ewart
Thomas Tourney
INVENTOR
James Oliver
By Leggett & Leggett
Attorneys

UNITED STATES PATENT OFFICE.

JAMES OLIVER, OF SOUTH BEND, INDIANA.

IMPROVEMENT IN PLOWS.

Specification forming part of Letters Patent No. 144,785, dated November 18, 1873; reissue No. 7,097, dated May 2, 1876; application filed June 19, 1875.

---

*To all whom it may concern:*

Be it known that I, JAMES OLIVER, of South Bend, county of St. Joseph, State of Indiana, have invented certain new and useful Improvements in Plows; and I do hereby declare the following to be such a full, clear, and exact description thereof as will enable others skilled in the art to which my invention relates to make and use it, reference being had to the accompanying drawings, which form a part of this specification.

My invention relates to that class of plows which have a colter above the plow-point; and consists in certain details of construction, as hereinafter specified and claimed.

Figure 1 is a plan view, and Fig. 2 a side elevation, of a plow embodying my invention. Fig. 3 is a perspective view of a plow-standard.

A represents an ordinary plow-beam, to which the standard B is attached. C is the plow-point, D the colter, E the land-side, and G the mold-board, of the plow. The mold-board thus extended by the addition of the plow-point and colter is made with them to conform with the circle and furrow line or working surface of the colter-point, and leaves or forms an unbroken surface from the front edge of the colter to the heel of the mold-board, which in use will grind perfectly throughout. By this means the clogging and sticking of the earth behind the colter-point are obviated, strength is added to the colter, and an easier and more natural turning mold-board is formed. The curvature of the mold-board and colter is such that in grinding and polishing the grindstone fits perfectly over all the surface. J represents a jointer attached to the plow-beam A above the plow-point, which is so constructed as to conform with the same curve as the mold-board and colter, and on the same principle. The standard B is recessed upon one side for the reception of the land-side, which land-side extends forward and forms a continuation of the front edge of the standard. On the other side of the standard it is formed to conform to the shape of the mold-board, which mold-board G extends forward even with the front edge of the standard, and forms, with the standard, a seat, against which the rear edge of the upper portion of the colter is seated. The lower end of the standard is enlarged and spread out beneath the plow-point C, forming a firm bearing or seat for the said plow-point, and to which it is directly attached. The forward edge of the standard, together with the forward edge of the mold-board and land-side, form a uniformly-curved seat for the colter and plow-point, the rear edges of which have a direct bearing against the entire forward edge of the mold-board. X represents that portion of the standard which may be termed the "shank," that extends between the mold-board and the plow-beam.

What I claim as new is—

1. The combination, with a mold-board, the upper edge of which is constructed to extend well forward the shank X of the standard, of a colter having the whole length of its rear edge seated directly against the front edge of the mold-board, and extending to the top and in line with the upper edge of the mold-board, substantially as and for the purpose described.

2. The standard B, extended forward, as shown at *a*, the mold-board and land side extended forward even with the standard, together forming a uniformly-curved seat for the colter and plow-point, substantially as described.

3. The standard B, extended forward, as at *a*, provided with bearings for and conforming to the shape of the mold-board and land-side, and with an enlarged foot for supporting the plow-point C, substantially as described.

4. The slanting land-side E, sloping inward from its top to bottom edge, in combination with the plow-point C and colter D, the said colter and plow-point seated directly against the forward edge of the mold-board through its entire length, substantially as and for the purpose described.

In witness whereof I hereunto set my hand this 11th day of June, A. D. 1875.

JAMES OLIVER.

Witnesses:

GEORGE PFLEGER,

P. J. CLUTE.